(12) United States Patent
Peterson et al.

(10) Patent No.: US 6,251,042 B1
(45) Date of Patent: Jun. 26, 2001

(54) HYBRID POWERTRAIN WITH AN INTEGRATED MOTOR/GENERATOR

(75) Inventors: Richard C. Peterson, Troy; William H. Haverdink, Sterling Heights; Andrew Leslie Bartos, Clarkston, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/434,925

(22) Filed: Nov. 5, 1999

(51) Int. Cl.$^7$ ............................................. B60K 6/02
(52) U.S. Cl. ................................................. 477/3; 74/339
(58) Field of Search ..................... 74/339; 477/3, 477/15; 180/65.4, 65.7

(56) References Cited

U.S. PATENT DOCUMENTS

| | | | |
|---|---|---|---|
| 2,571,284 | * 10/1951 | Nims | 477/3 |
| 5,337,848 | * 8/1994 | Bader | 180/65.7 |
| 5,560,249 | * 10/1996 | Nellums | 74/339 |
| 5,839,533 | * 11/1998 | Mikami et al. | 180/65.6 |
| 5,979,257 | * 11/1999 | Lawrie | 74/339 |

\* cited by examiner

*Primary Examiner*—Sherry Estremsky
(74) *Attorney, Agent, or Firm*—George A. Grove

(57) ABSTRACT

A hybrid powertrain has a suitable heat engine having rotational output, a multi-speed transmission and a motor/generator (MG). The transmission input or cluster shaft is continuously connected with the MG. One set of ratio gears in the transmission is continuously drivingly connected to an accessory drive. The cluster shaft and a main shaft are selectively interconnected through a plurality of sets of ratio gears that are activated through the selective engagement of synchronizers associated with the ratio gears on the main shaft. The engine is selectively drivingly connected with the cluster shaft through a launch device such as a friction clutch. The output of the transmission, a differential, can be driven by the engine only, by the MG only or by a combination of the engine and the MG. The accessory mechanism is selectively connectable with the accessory drive and may also be driven under the same conditions as the transmission output as well as by the MG when the engine is off and the vehicle is stationary.

3 Claims, 1 Drawing Sheet

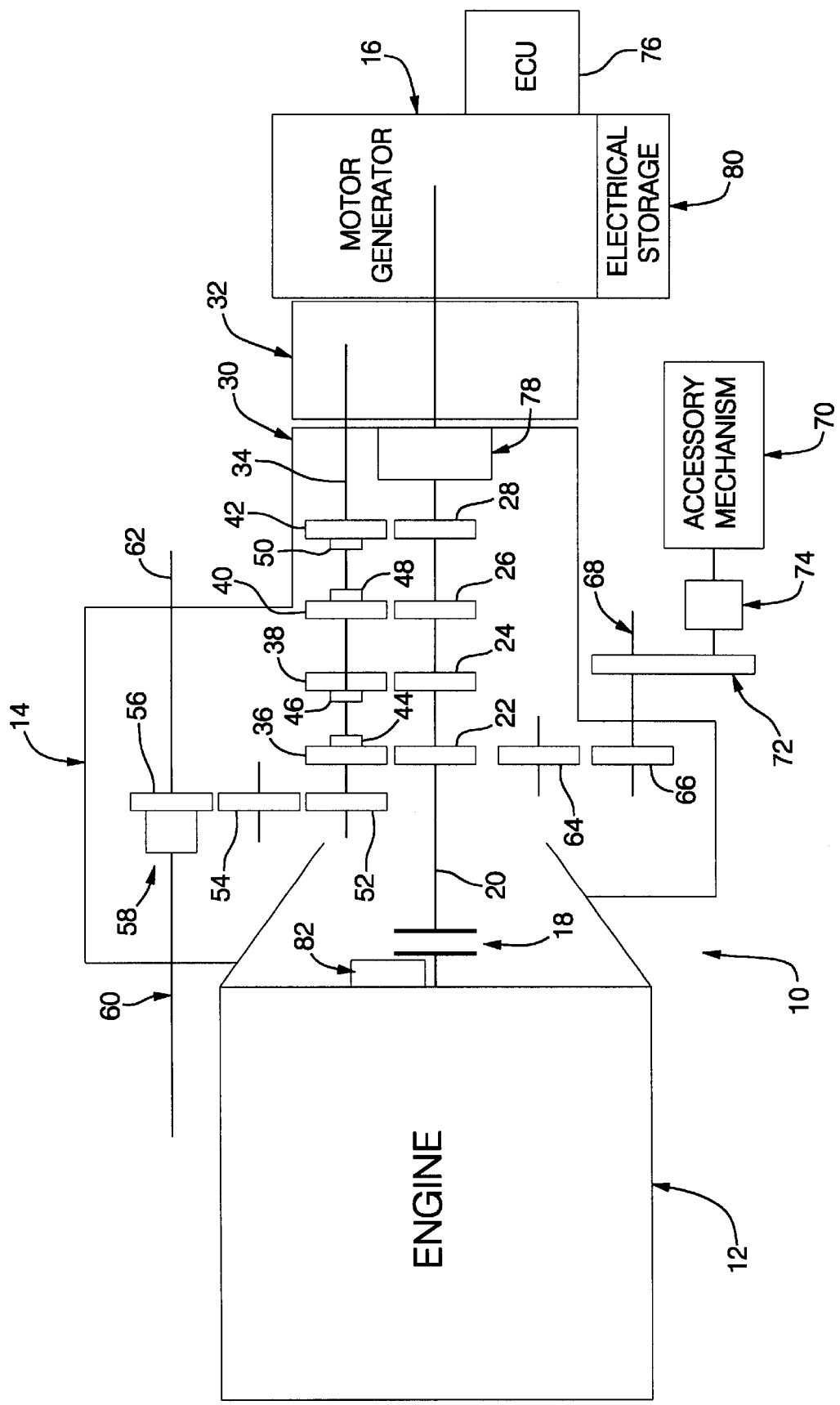

HYBRID POWERTRAIN WITH AN INTEGRATED MOTOR/GENERATOR

TECHNICAL FIELD

This invention relates to hybrid powertrains having an electric motor which is operable to supply power in parallel with a suitable heat engine having rotational output.

BACKGROUND OF THE INVENTION

Electric hybrid-type powertrains may employ an internal combustion engine and one or more motor/generator units that operate in concert to provide driving power to the wheels of a vehicle. The electric portion of the vehicle is generally used where noise or exhaust emissions are of prime concern. This type of vehicle is suited for operation in a closed environment (electric drive), such as a passenger terminal, and an open environment (engine drive), such as a parking structure. Thus, the vehicle is ideal for transporting passengers from a terminal to a parking structure.

Vehicles employing a hybrid powertrain are also well suited for urban transportation where a significant amount of stop and go driving is undertaken. These vehicles propose electrical regenerative braking to recharge the electrical power storage devices (batteries).

The hybrid powertrains are also suited for over-the-road transportation where the electric drive units can be utilized to assist in driving the vehicle during high-power output conditions such as rapid acceleration and hill climbing. The electric drive units might also provide propulsion in the event that engine operation is inadvertently discontinued.

In most of the electro/mechanical hybrid powertrains, the electrical and mechanical drive units are designed to operate in all of the vehicle driving conditions. Also, the powertrains generally include planetary type gearing which is designed to effectively combine the electrical and mechanical drive units into an integrated system.

SUMMARY OF THE INVENTION

It is an object of the present invention to provide an improved hybrid powertrain having a mechanical drive unit and an electrical drive unit.

In one aspect of the present invention, a hybrid vehicle powertrain incorporates a suitable heat engine having rotational output, a multi-speed parallel shaft transmission, a motor/generator (MG), and an accessory drive. In another aspect of the present invention, the accessory drive is driven by the engine, or the MG or the vehicle. In another aspect of the present invention, the MG operates as a starter motor for the engine. In yet another aspect of the present invention, the power output of the MG and the engine are combined to drive the vehicle. In still another aspect of the present invention, the main shaft and cluster shaft of the transmission are synchronized during a ratio interchange by the MG.

In yet still another aspect of the present invention, the MG is conditioned to recover energy by charging the electrical storage batteries during vehicle deceleration. In a further aspect of the present invention, the MG supplies the sole driving power during reverse operation of the vehicle, thereby eliminating the need for a reverse idler gear in the transmission. In yet a further aspect of the present invention, the MG provides the sole power to propel the vehicle. In still a further aspect of the present invention, the MG is coupled directly to the engine through a selectively engageable clutch. In a yet still further aspect of the present invention, the MG is selectively engaged with the engine to recharge the storage batteries.

BRIEF DESCRIPTION OF THE DRAWINGS

The drawing is a diagrammatic representation of a hybrid powertrain incorporating the present invention.

DESCRIPTION OF AN EXEMPLARY EMBODIMENT

A hybrid powertrain 10 has a suitable heat engine having rotational output, for example, a spark-ignited or compression-ignited internal combustion engine 12, a multi-speed transmission 14 and a motor/generator (MG) 16. The multi-speed transmission has an input clutch 18 that is enclosed in a bell housing secured to the engine 12. The clutch 18 is selectively drivingly connected to a cluster shaft 20 on which is secured a plurality of ratio gears 22, 24, 26 and 28. The cluster shaft 20 is also drivingly connected with the MG 16. The cluster shaft is rotatably supported in a transmission housing 30 as well as a bearing plate 32 that is positioned between the transmission 14 and the MG 16.

A main shaft 34 is also rotatably supported in the transmission housing 30 and the bearing plate 32. A plurality of ratio gears 36, 38, 40 and 42 are rotatably supported on the main shaft 34. The ratio gears 36, 38, 40 and 42 continually mesh with respective ratio gears 22, 24, 26 and 28. Each ratio gear 36, 38, 40 and 42 is selectively drivingly connectable with the main shaft 34 by respective synchronizers 44, 46, 48 and 50. An output gear 52 is also continually drivingly connected with the main shaft 34.

The output gear 52 meshes with an idler gear 54 which in turn meshes with a ring gear 56 that is a component of a conventional differential assembly 58. The differential assembly 58 has a pair of axle shafts 60, 62 that are drivingly connected with vehicle wheels, not shown, in a conventional manner. The idler gear 54 is utilized to achieve the desired direction of axle rotation. If the engine rotates in the opposite direction or a different powertrain configuration is required, the idler gear 54 will be eliminated.

The ratio gear 22 is in constant mesh with an idler gear 64 which in turn meshes with a gear 66 that is drivingly connected with an accessory drive shaft 68. The accessory shaft 68 is drivingly connected with an engine or vehicle accessory mechanism 70 through a flexible drive mechanism 72. The accessory mechanism 70 may be a climate-system compressor, a hydraulic pump, or other externally driven mechanism required by the engine or vehicle. The flexible drive mechanism may take the form of a belt drive or a chain drive. In the alternative, a gear drive can be utilized between the shaft 68 and the accessory mechanism 70, or the accessory mechanism 70 can be driven directly by the shaft 68. It will be noted that the accessory shaft 68 is rotated whenever the shaft 20 is rotating. The accessory mechanism 70 includes a conventional electromagnetic clutch 74 disposed between the drive mechanism 72 and the accessory mechanism 70.

An electronic control module (ECU) 76 is incorporated in the powertrain 10 to provide a control for the engine, transmission, MG and accessory mechanism 70. The ECU 76 includes a conventional programmable digital computer, not shown, that is provided by the ECU with input signals such as engine speed, transmission input speed, transmission ratio, condition of the MG 16, transmission output speed, vehicle speed and requests for operation of the accessory mechanism 70. The ECU 76 may control the powertrain 10 in accordance with a suitable control process, several of which are known in the art of powertrain controls.

The ECU 76 delivers commands to the various components of the powertrain 10 based on the output of the digital computer. These commands include ratio interchange commands to an electromechanical controller 78 that operates the synchronizers 44, 46, 48 and 50 to establish the gear ratios between the cluster shaft 20 and the main shaft 34. The clutch 18 is also controlled to be engaged and disengaged by an electro-hydraulic controller 82 which receives commands from the ECU 76. The electro-hydraulic controller and electromechanical controller are conventional devices that control the engaged and disengaged position of each of the synchronizers 44, 46, 48 and 50 as well as the clutch 18. The ECU 76 also controls the operating condition of the MG 16.

The ratio gears 28 and 42 establish a first and lowest gear ratio between the cluster shaft 20 and the main shaft 34 when the synchronizer 50 is engaged. This ratio provides the highest torque output for a given torque input which will permit launching of the vehicle and initial acceleration. The ratio gears 22 and 36 establish the fourth and highest gear ratio between the cluster shaft 20 and the main shaft 34 when the synchronizer 44 is engaged. The fourth ratio provides the highest output speed for a given input speed which will permit good fuel economy during highway driving. The ratio gears 26, 40 and the ratio gears 24, 38 establish a second and third ratio between the cluster shaft 20 and the main shaft 34 when the respective synchronizers 48 and 46 are engaged. These ratios will assist in accelerating the vehicle from the low speed at first gear to the high speed at fourth gear.

The MG 16 is operated as a motor to provide a synchronized speed between the cluster shaft 20 and the main shaft 34 when a ratio interchange is requested either by the operator or the ECU 76. When a ratio interchange is requested, the clutch 18 and the off-going synchronizer are disengaged, the MG 16 rotates the cluster shaft 20 to the proper speed relation relative to the main shaft 34 and then the oncoming synchronizer is engaged. This improves the shift smoothness and shift quality of the powertrain. The ratio interchange can also take place without the disengagement of the clutch 18. However, in this case, the MG 16 will change the speed of both the cluster shaft 20 and the engine 12 to synchronize the cluster shaft 20 and the main shaft 34.

The cluster shaft 20 is continually connected with the MG 16 and to one side of the clutch 18. When the clutch 18 is engaged, the engine 12 is connected with the cluster shaft 20. The clutch is preferably engaged with hydraulic fluid supplied by the electro-hydraulic controller 82 under the control of the ECU 76 depending on the operating conditions and requests from the operator. When the operator commands an engine start, the clutch 18 is engaged and the MG 16 is rotated as a motor so that the engine can be rotated at a speed sufficient to cause starting thereof.

When the vehicle comes to a rest, the engine can be disconnected from the shaft 20 and permitted to stop or idle unloaded. The accessory mechanism 70, if required, can be driven by the MG 16 when the engine is disconnected. The clutch 74, as previously stated, will connect the accessory mechanism 70 to be driven through the gearing 22, 64, 66, the shaft 68 and the flexible drive mechanism 72.

The vehicle can be driven forwardly either by the engine 12, the MG 16 or a combination of these components. The operator can select the drive condition desired through the ECU 76. The ECU 76 will enforce the selection of the proper gear ratio to be engaged depending on the operating condition selected. For example, if the driver selects an automatic drive condition, the ECU 76 will cause the automatic ratio changes as needed to operate the vehicle in a well-known manner. If the operator selects a reverse drive, the clutch 18 is disengaged, the low ratio is engaged through the operation of the synchronizer 50 and the MG 16 is rotated in a direction opposite to the normal rotation direction of the engine 12. It should be noted that the transmission 14 can be operated in a ratio other than low, if desired, during reverse operation. The engine 12 is not operated in reverse.

During vehicle braking, the MG 16 is driven by the cluster shaft from the main shaft as a generator to charge a complement of electrical storage members 80. The vehicle uses electro-dynamic braking as well as conventional friction braking. The electrical storage 80 supplies power to the MG 16 when it is operated as a motor. The MG 16 can also be driven as a generator during normal vehicle operation to maintain a specific minimum charge at the electrical storage 80.

From the above description it should be now apparent that a hybrid vehicle incorporating the present invention has many advantages over the prior art systems, particularly conventional engine/transmission systems. The following are some of the advantages of the above-described hybrid powertrain:

The MG 16, operating as a motor, adds to the engine torque during acceleration under maximum power to improve the fuel economy through downsizing of the engine relative to the size required for engine acceleration alone;

The MG 16 operates as a motor to start the engine 12, thus reducing the mass and space needed for a conventional starter motor;

The MG 16 recovers electrical energy during vehicle braking which enhances fuel economy since the energy is not lost to friction braking;

The accessory mechanism 70 can be driven by the vehicle during deceleration with the engine off, thus improving fuel economy since the engine would normally be operated at a power level to provide this function;

The MG 16 can be used as a motor to power the accessory mechanism 70 when the vehicle is stationary so that the engine 12 can be off, thereby improving fuel economy;

The MG 16 is driven as a motor to synchronize the rotary speed between the cluster shaft 20 and the main shaft 34 during a ratio interchange which will improve shift quality;

The MG 16 is employed as a motor rotating opposite to the direction of engine rotation to drive the vehicle in reverse, thereby eliminating the need for reverse idler gearing to reduce transmission complexity; and The MG 16 is operated, when necessary, to propel the vehicle without the engine in either the forward or reverse.

What is claimed is:

1. A hybrid powertrain comprising:

a suitable heat engine having rotational output and a direction of rotation;

a multi-speed transmission having a main shaft rotatably supporting a plurality of ratio gears each having a mechanism for engaging said main shaft, a cluster shaft having a plurality of ratio gears drivingly connected therewith and meshing with respective ones of the ratio gears on said main shaft, said ratio gears on said cluster shaft and said main shaft cooperating to provide a plurality of gear ratios between said cluster shaft said main shaft in one rotary direction;

a selectively engageable input clutch mechanism disposed to selectively connect said engine with said cluster shaft to enforce forward rotation of said main shaft when said engine is inputting rotation to said cluster shaft, a motor/generator continuously drivingly connected with said cluster shaft to selectively deliver power thereto and to receive power therefrom said motor/generator being driven in a direction of rotation opposite to said engine direction to enforce reverse rotation of said main shaft when one of said ratios is established between said cluster shaft and said main shaft;

a gear train drivingly connected with one of said ratio gears on said cluster shaft;

a selectively engageable clutch and drive mechanism drivingly connected with said gear train; and an accessory mechanism selectively driven by said drive mechanism through said selectively engageable clutch when said one ratio gear is driven by either said engine or said motor/generator.

2. The hybrid powertrain defined in claim 1, further comprising:

said ratio gears on said main shaft being selectively engaged therewith to provide a plurality of drive ratios between said cluster shaft and said main shaft and being selectively interchanged by said engaging mechanisms to change the drive ratio from a first ratio to a second ratio; and said motor generator being controlled to synchronize a speed ratio of said cluster shaft with said main shaft to be substantially equal to the second ratio between said cluster shaft and said main shaft.

3. The hybrid powertrain defined in claim 1, further comprising:

said engaging mechanisms of said main shaft ratio gears being operable to be interchanged to effect a speed ratio change between said main shaft and said cluster shaft; and said motor/generator being operable to change the speed of said cluster shaft from a first speed to a second speed to effect a speed synchronization of said main shaft to said cluster shaft during the speed ratio change.

* * * * *